United States Patent
D'Silva et al.

(10) Patent No.: US 7,610,127 B2
(45) Date of Patent: Oct. 27, 2009

(54) VEHICLE STABILITY MONITORING SYSTEM AND METHOD AND ARTICLE OF MANUFACTURE FOR DETERMINING VEHICLE STABILITY

(75) Inventors: Siddharth H. D'Silva, Rochester Hills, MI (US); Laci J. Jalics, Ray, MI (US); Mark K. Krage, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 308 days.

(21) Appl. No.: 11/371,058

(22) Filed: Mar. 8, 2006

(65) Prior Publication Data

US 2007/0213885 A1  Sep. 13, 2007

(51) Int. Cl.
*B60Q 1/00* (2006.01)
(52) U.S. Cl. .................................. 701/31; 340/438
(58) Field of Classification Search .................. 701/31; 340/438

See application file for complete search history.

(56) References Cited

U.S. PATENT DOCUMENTS

| | | | |
|---|---|---|---|
| 5,454,114 A * | 9/1995 | Yach et al. | 713/330 |
| 5,927,421 A * | 7/1999 | Fukada | 180/197 |
| 6,023,668 A * | 2/2000 | Genoux | 702/187 |
| 6,488,109 B1 * | 12/2002 | Igaki et al. | 180/169 |
| 6,604,026 B2 | 8/2003 | Schmitt | 701/1 |
| 6,623,089 B2 | 9/2003 | Amberkar | 303/146 |
| 6,725,135 B2 | 4/2004 | McKeown et al. | 701/29 |
| 6,813,552 B2 * | 11/2004 | Ghoneim et al. | 701/70 |
| 6,829,524 B2 * | 12/2004 | Chee | 701/1 |
| 6,853,898 B2 * | 2/2005 | Farmer et al. | 701/45 |
| 6,856,885 B2 * | 2/2005 | Lin et al. | 701/70 |
| 6,856,886 B1 * | 2/2005 | Chen et al. | 701/70 |
| 6,865,468 B2 * | 3/2005 | Lin et al. | 701/70 |
| 6,898,500 B2 | 5/2005 | Kobayashi | 701/48 |
| 6,934,611 B2 | 8/2005 | McKeown et al. | 701/29 |
| 6,937,924 B1 * | 8/2005 | Statler et al. | 701/14 |
| 6,957,873 B2 * | 10/2005 | Wanke et al. | 303/140 |
| 6,959,970 B2 * | 11/2005 | Tseng | 303/146 |
| 7,206,674 B1 * | 4/2007 | Statler et al. | 701/14 |
| 7,274,984 B2 * | 9/2007 | Shin et al. | 701/70 |
| 2003/0078700 A1 * | 4/2003 | Chee | 701/1 |
| 2003/0135346 A1 * | 7/2003 | Farmer et al. | 702/150 |
| 2003/0200022 A1 * | 10/2003 | Streichsbier et al. | 701/108 |

(Continued)

OTHER PUBLICATIONS

Yixin Chen, John Phillips, Linson Qiao. Improving Software Subsystem Testing with Mahalanobis-Taguchi System. ASI's 20th Annual Symposium. www.asiusa.com/knowledge/S21_03.pdf. pp. 302-310.*

(Continued)

*Primary Examiner*—Jack W. Keith
*Assistant Examiner*—Ari M. Diacou
(74) *Attorney, Agent, or Firm*—Thomas N. Twomey

(57) ABSTRACT

A vehicle stability monitoring system and a method and an article of manufacture for determining vehicle stability are provided. The vehicle stability monitoring system includes a plurality of vehicle sensors generating a plurality of signals. The vehicle stability monitoring system further includes a computer operably communicating with the plurality of vehicle sensors. The computer is configured to calculate a first value indicative of vehicle stability at a first predetermined time based on the plurality of signals.

6 Claims, 9 Drawing Sheets

U.S. PATENT DOCUMENTS

| | | | |
|---|---|---|---|
| 2004/0098184 A1* | 5/2004 | Ghoneim et al. | 701/70 |
| 2004/0122604 A1* | 6/2004 | Gelsomino | 702/56 |
| 2004/0199321 A1* | 10/2004 | Lin et al. | 701/70 |
| 2005/0021201 A1* | 1/2005 | Klotz et al. | 701/35 |
| 2006/0100766 A1* | 5/2006 | Schwarz et al. | 701/71 |
| 2006/0158031 A1* | 7/2006 | Kummel et al. | 303/146 |

OTHER PUBLICATIONS

Siddharth H. D'Silva, Laci Jalics and Mark Krage. A Statistical Approach for Real-Time Prognosis of Safety-Critical Vehicle Systems. SAE Technical Paper Series 2007-01-1497. 2007 World Congress Detroit, Michigan Apr. 16-19, 2007.*

Cudney, Elizabeth A., Paryani, Kioumars, Ragsdell, Kenneth M. Applying the Mahalanobis-Taguchi System to Vehicle Handling Concurrent Engineering 2006 14: 343-354. http://cer.sagepub.com/cgi/reprint/14/4/343.*

Erik Dahlberg, Annika Stensson. The dynamic rollover threshold—a heavy truck sensitivity study. International Journal of Vehicle Design 2006—vol. 40, No. 1/2/3 pp. 228-250. DOI: 10.1504/IJVD.2006.008463. http://www.inderscience.com/storage/f492101126735118.pdf.*

Putting Taguchi methods to work to solve design flaws. By James O. Wilkins Jr. Quality Progress; May 2000; 33, 5; ABI/INFORM Global. p. 55-59.*

Anand Santhanam; M. Masudur Rahman, "Moving Vehicle Classification Using Eigenspace," Intelligent Robots and Systems, 2006 IEEE/RSJ International Conference on , vol., no., pp. 3849-3854, Oct. 2006 URL: http://ieeexplore.ieee.org/iel5/4058334/4058335/04059006.pdf.*

Genichi Taguchi, Subir Chowdhury, Yuin Wu. The Mahalanobis-Taguchi System. Published 2000. McGraw-Hill Professional. http://books.google.com/books?id=5AOuyyccV8kC&printsec=frontcover&sig=WdZNGINfzuveQpcYASuCMCvuiOM.*

R. De Maesschalck, D. Jouan-Rimbaud and D. L. Massart, The Mahalanobis distance, Chemometrics and Intelligent Laboratory Systemsvol. 50, Issue 1, , Jan. 4, 2000, pp. 1-18. (http://www.sciencedirect.com/science/article/B6TFP-3Y8VGYK-1/2/92ac3e8ac922320df9a62b096aca9bee).*

Jenness, J. 2003. Mahalanobis distances (mahalanobis.avx) extension for ArcView 3.x, Jenness Enterprises. Available at: http://www.jennessent.com/arcview/mahalanobis.htm.*

* cited by examiner

VEHICLE STABILITY MONITORING SYSTEM AND METHOD AND ARTICLE OF MANUFACTURE FOR DETERMINING VEHICLE STABILITY

TECHNICAL FIELD

This application relates to a vehicle stability monitoring system and a method and an article of manufacture for determining vehicle stability.

BACKGROUND

In the automotive industry, there has been increased impetus to develop vehicle safety subsystems that directly contribute to improved active vehicle safety. For example, the automotive industry has developed vehicle safety subsystems including antilock brake systems, electronic stability control systems, active steering systems, and active rollover systems. The vehicle safety subsystems, however, do not utilize a single performance indicator or metric that quantifies the vehicle stability as a whole based on a plurality of signals.

Accordingly, the inventors herein have recognized a need for an improved vehicle stability monitoring system that utilizes a single metric to quantify the stability of the vehicle as a whole.

SUMMARY OF THE INVENTION

A method for determining vehicle stability in accordance with an exemplary embodiment is provided. The method includes generating a plurality of signals from a plurality of vehicle sensors. The method further includes calculating a first value indicative of vehicle stability at a first predetermined time based on the plurality of signals, utilizing a processor operably communicating with the plurality of vehicle sensors.

A vehicle stability monitoring system in accordance with another exemplary embodiment is provided. The vehicle stability monitoring system includes a plurality of vehicle sensors generating a plurality of signals. The vehicle stability monitoring system further includes a computer operably communicating with the plurality of vehicle sensors. The computer is configured to calculate a first value indicative of vehicle stability at a first predetermined time based on the plurality of signals.

An article of manufacture in accordance with another exemplary embodiment is provided. The article of manufacture includes a computer storage medium having a computer program encoded therein for determining vehicle stability. The computer storage medium includes code for receiving a plurality of signals from a plurality of vehicle sensors. The computer storage medium further includes code for calculating a first value indicative of vehicle stability at a first predetermined time based on the plurality of signals, utilizing a processor operably communicating with the plurality of vehicle sensors.

DESCRIPTION OF EXEMPLARY EMBODIMENTS

Figure 1:
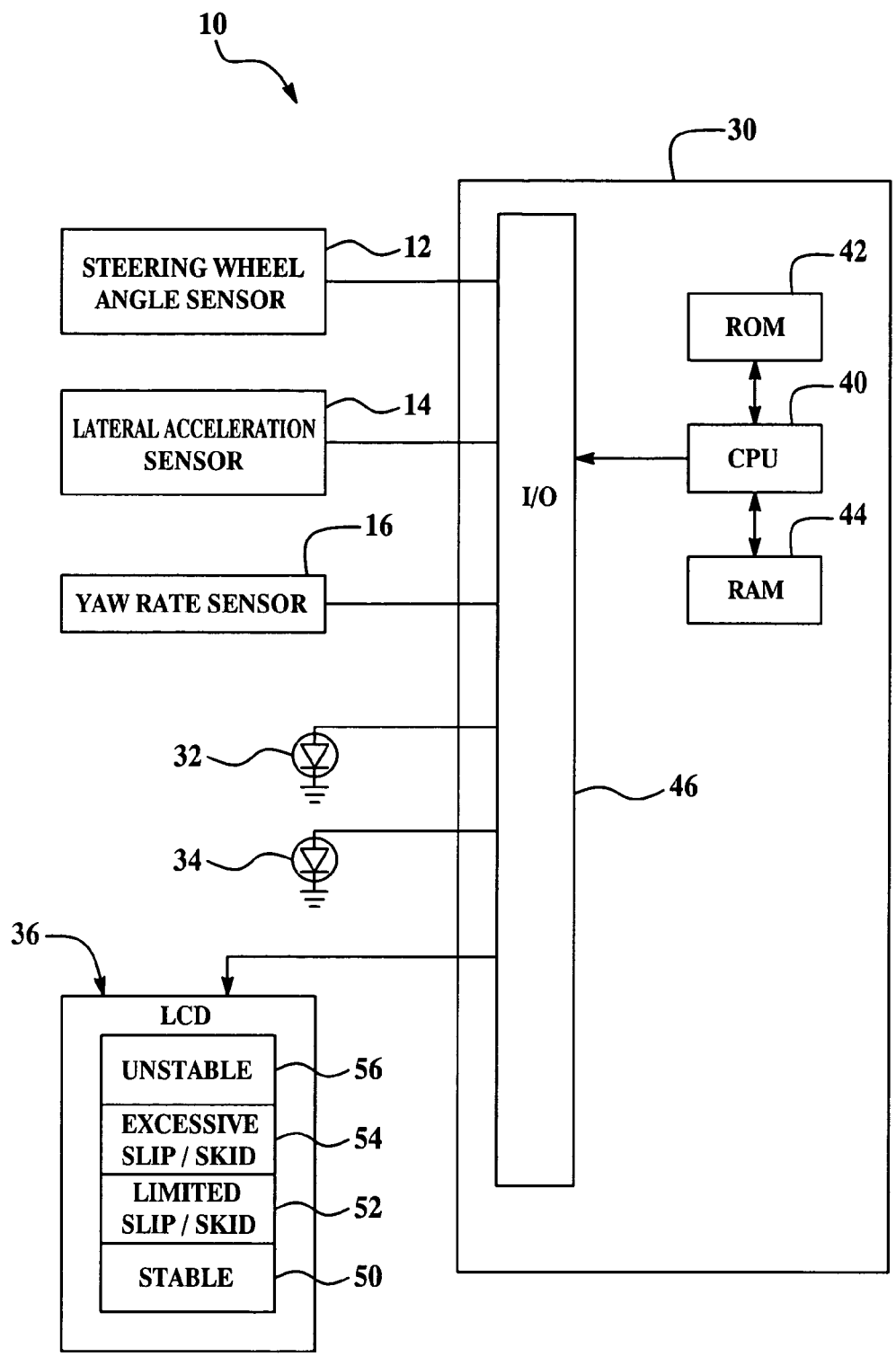
FIG. 1 is a block diagram of a vehicle stability monitoring system in accordance with an exemplary embodiment.
Figure 2:
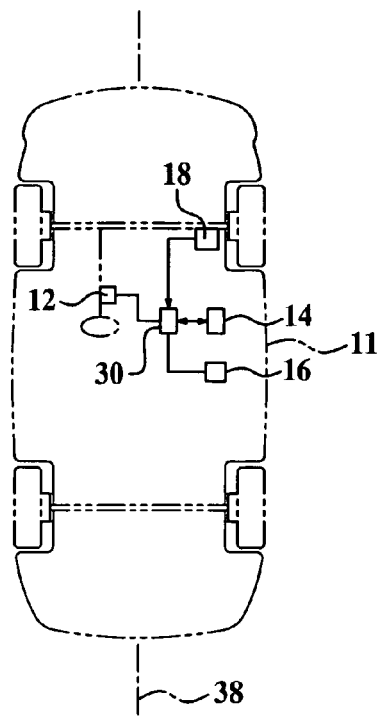
FIG. 2 is a simplified diagram of a vehicle having the vehicle stability monitoring system of FIG. 1.
Figure 3:
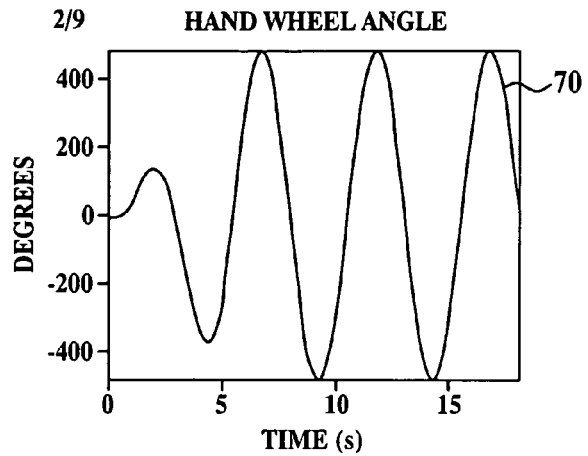
FIG. 3 is a signal schematic of an exemplary steering wheel angle signal generated by a steering wheel angle sensor during a vehicle maneuver, utilized in the vehicle stability monitoring system of FIG. 1.
Figure 4:
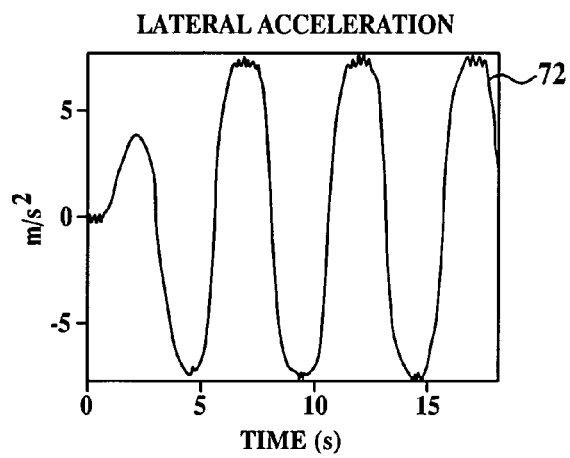
FIG. 4 is a signal schematic of an exemplary lateral acceleration signal generated by a lateral acceleration sensor during the vehicle maneuver, utilized in the vehicle stability monitoring system of FIG. 1.
Figure 5:
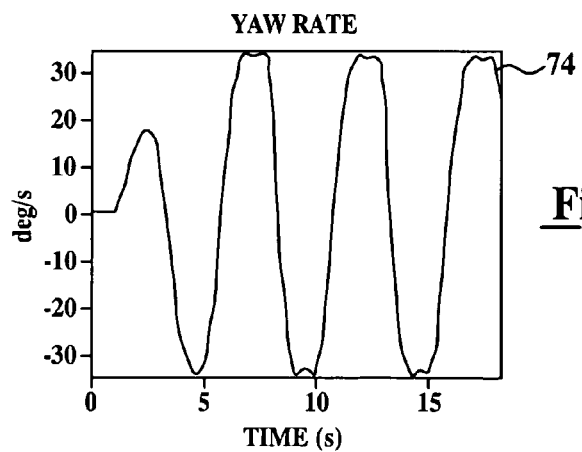
FIG. 5 is a signal schematic of an exemplary yaw rate signal generated by a yaw rate sensor during the vehicle maneuver, utilized in the vehicle stability monitoring system of FIG. 1.
Figure 6:
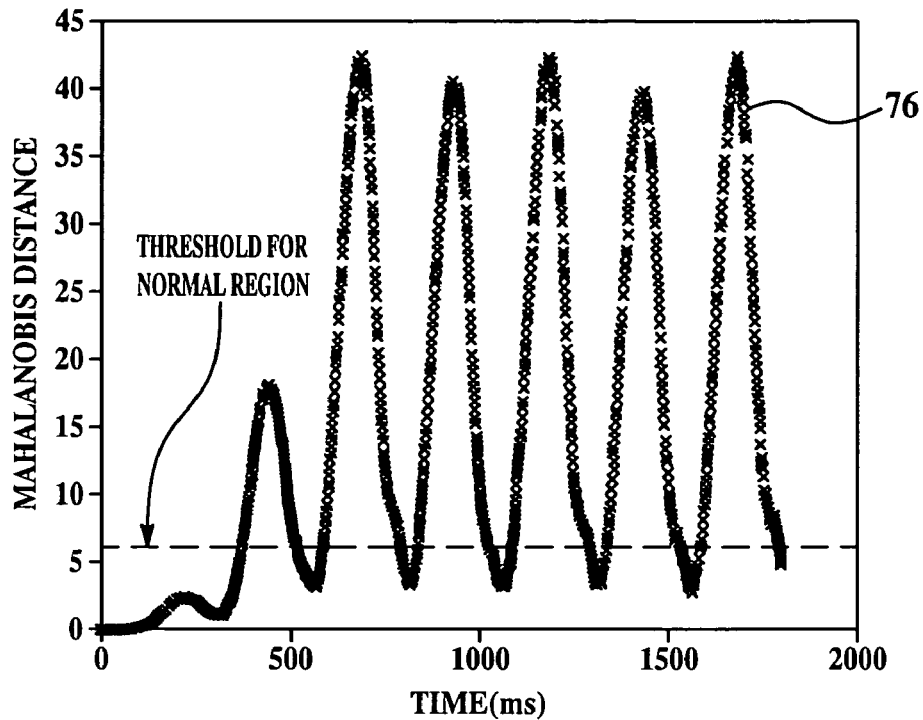
FIG. 6 is a schematic of a plurality of exemplary Mahalanobis distance values generated by the vehicle stability monitoring system of FIG. 1.

Referring to FIGS. 1 and 2, a vehicle stability monitoring system 10 for determining a stability of a vehicle 11 is illustrated. In particular, the vehicle stability monitoring system 10 can be utilized to determine the real-time stability of a vehicle such as a car, a truck, or a sports utility vehicle, or the like, for example. The vehicle stability monitoring system 10 includes a steering wheel angle sensor 12, a lateral acceleration sensor 14, a yaw rate sensor 16, a computer 30, light emitting diodes (LEDs) 32, 34, and a liquid crystal display (LCD) 36. An advantage of the vehicle stability monitoring system 10 is that the system 10 generates a single value indicative of overall vehicle stability from a plurality of vehicle sensors.

The steering wheel angle sensor 12 is provided to generate a signal indicative of an angular position of a steering wheel of the vehicle 11. The steering wheel angle sensor 12 is electrically coupled to the I/O interface 46 of the computer 30.

The lateral acceleration sensor 14 is provided to generate a signal indicative of a lateral acceleration of the vehicle 11. The lateral acceleration sensor 14 is electrically coupled to the interface 46 of the computer 30.

The yaw rate sensor 16 is provided to generate a signal indicative of a yaw rate of the vehicle 11. The yaw rate sensor 16 is electrically coupled to the input/output (I/O) interface 46 of the computer 30.

The computer 30 is provided to execute algorithms for determining stability of the vehicle 11. The computer 30 includes a central processing unit (CPU) 40, a read-only memory (ROM) 42, a volatile memory such as a random access memory (RAM) 44 and the I/O interface 46. The CPU 40 operably communicates with the ROM 42, the RAM 44, and the I/O interface 46. The computer readable media including ROM 42 and RAM 44 may be implemented using any of a number of known memory devices such as PROMs, EPROMs, EEPROMS, flash memory or any other electric, magnetic, optical or combination memory device capable of storing data, some of which represent executable instructions used by the CPU 40. The CPU 40 communicates via the I/O interface 46 with the steering wheel angle sensor 12, the lateral acceleration sensor 14, the yaw rate sensor 16, and the LCD 36.

The LED 32 is provided to emit light when the vehicle 11 has a stable vehicle stability condition, in response to a control signal from the computer 30. The LED 32 is disposed inside of the vehicle 11 such that an operator of the vehicle can view light emitted from the LED 32. The LED 32 is electrically coupled between the I/O interface 46 and electrical ground.

The LED 34 is provided to emit light when the vehicle 11 has an unstable vehicle stability condition, in response to a control signal from the computer 30. The LED 34 is disposed inside of the vehicle 11 such that an operator of the vehicle can view light emitted from the LED 34. The LED 34 is electrically coupled between I/O interface 46 and electrical ground.

Referring to FIGS. 3-6, a brief description of the functionality of an exemplary embodiment of the vehicle stability monitoring system 10 will be provided before providing a detailed explanation of the various flowcharts associated therewith. The signal curve 70 represents a plurality of measured steering wheel angle values obtained from the steering wheel angle sensor 12 over a predetermined time interval. The signal curve 72 represents a plurality of measured lateral acceleration values obtained from the lateral acceleration sensor 14 over the predetermined time interval. The signal curve 74 represents a plurality of measured yaw rate values obtained from the yaw rate sensor 16 over the predetermined time interval. During operation, the computer 30 iteratively calculates a Mahalanobis value based upon a measured steering wheel angle value, a lateral acceleration value, and a yaw rate value. The curve 76 represents a plurality of Mahalanobis values calculated over the predetermined time interval. In one exemplary embodiment, when a Mahalanobis value is less or equal to than a threshold value (e.g., threshold value=6), the computer 30 determines that the vehicle 11 has a stable vehicle stability condition. Further, when a Mahalanobis value is greater than the threshold value (e.g., threshold value=6), the computer 30 determines that the vehicle 11 has an unstable vehicle stability condition.

Figure 8:
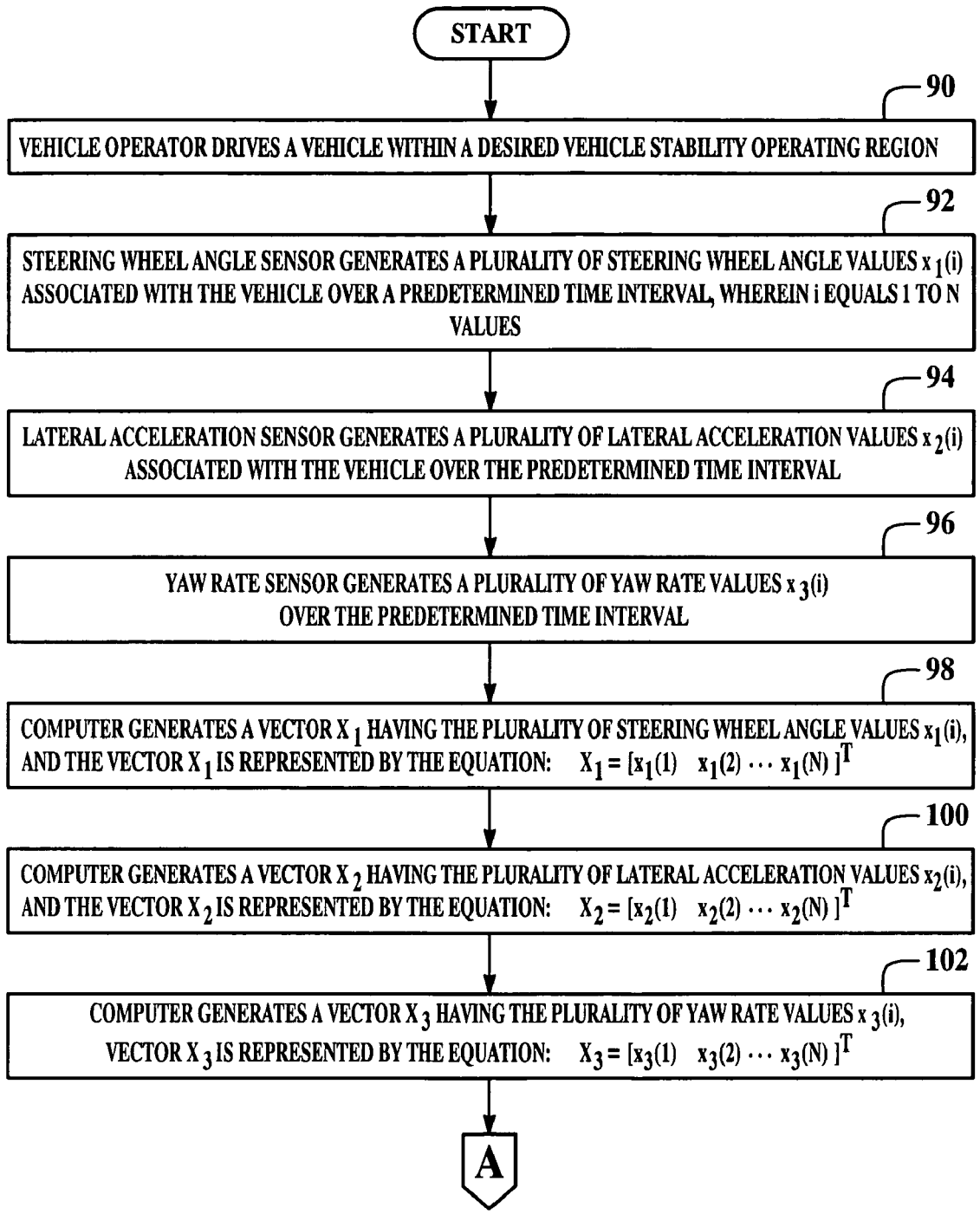
FIGS. 8-10 are flowcharts of a method for determining a threshold Mahalanobis distance value.
Figure 9:
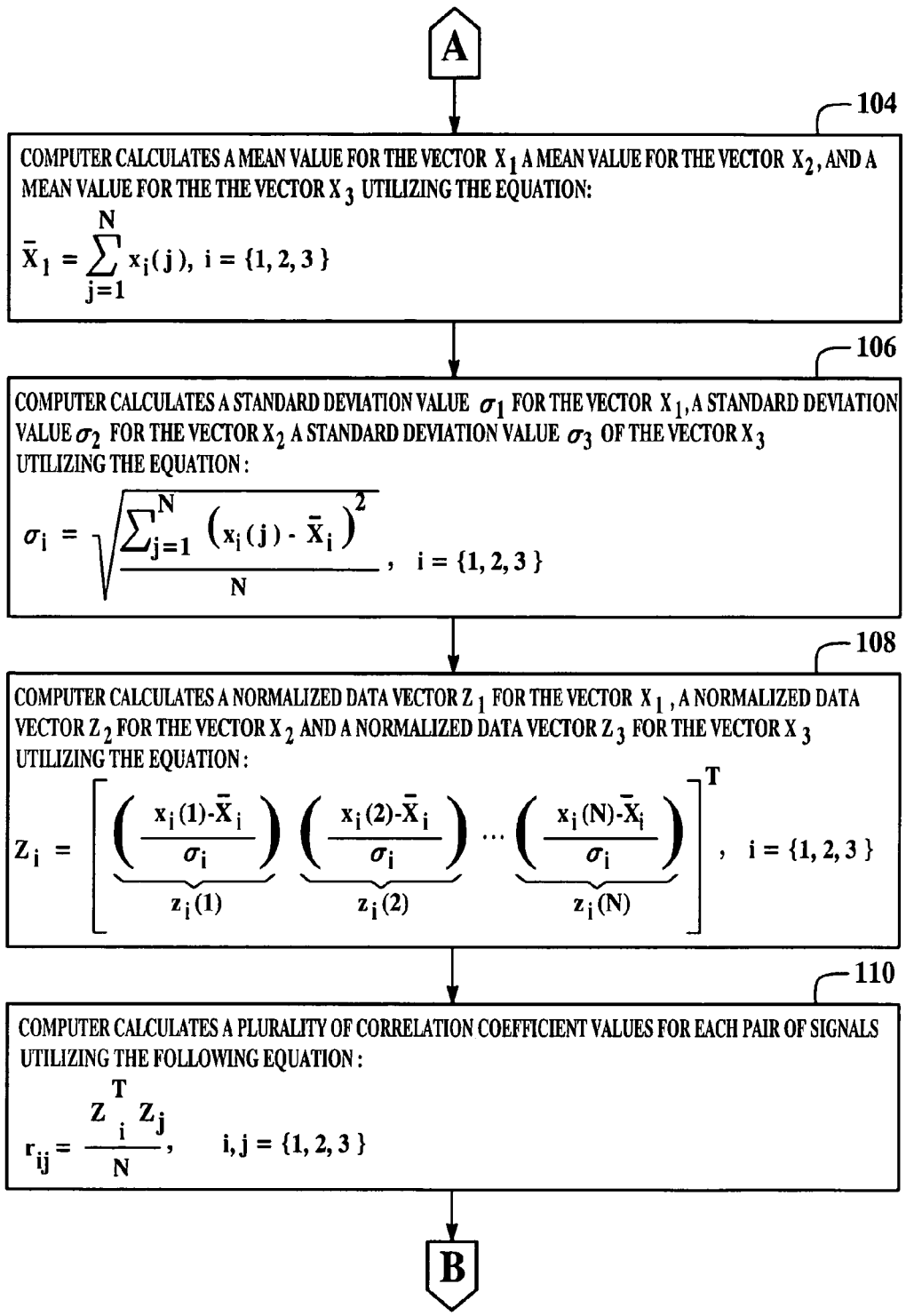
Figure 10:
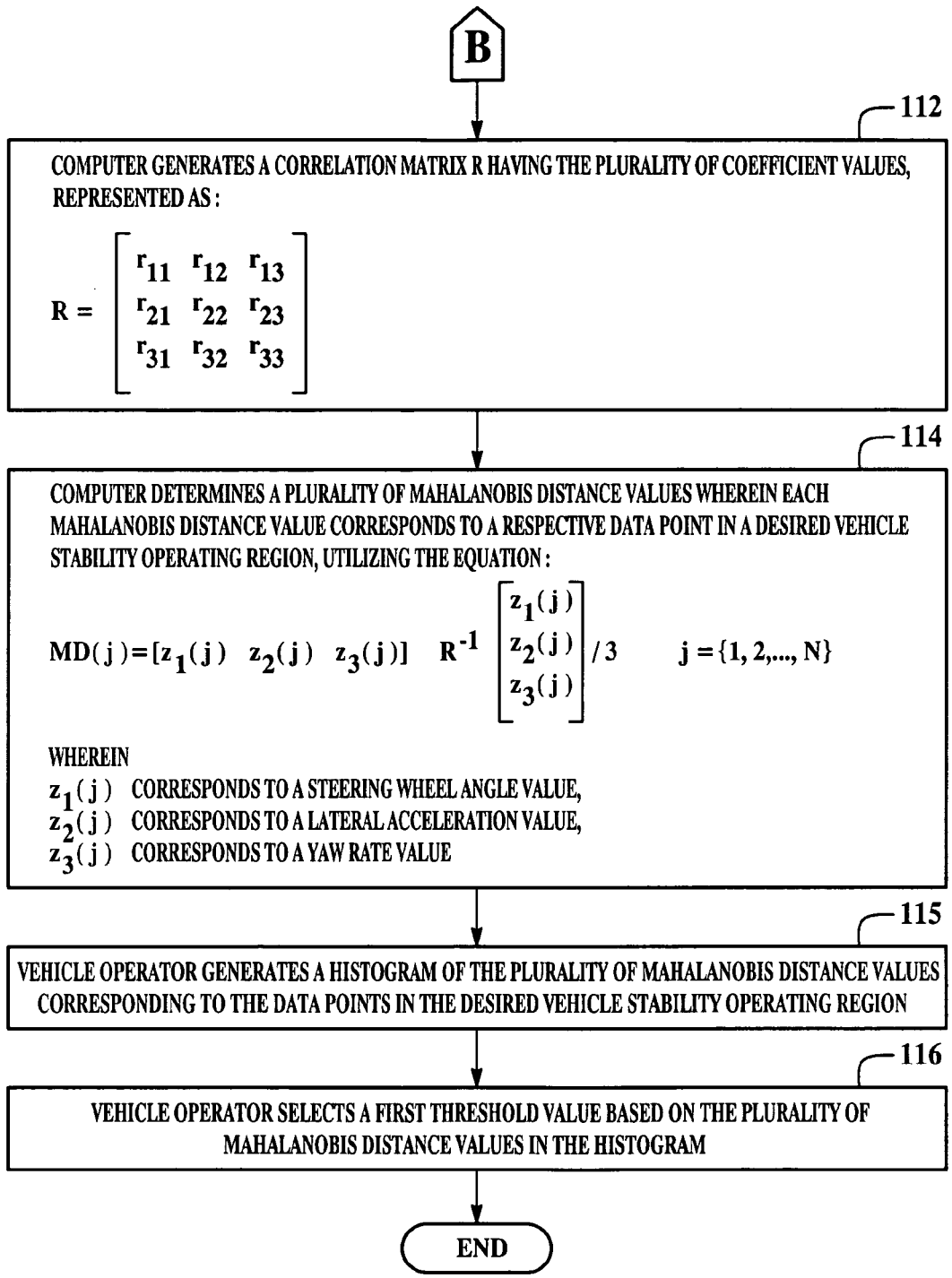

Referring to FIGS. 8-10, a method for determining a first threshold value that will subsequently be utilized to determine whether the vehicle 11 has a stable vehicle stability condition or an unstable vehicle stability condition, will now be described.

At step 90, a vehicle operator drives the vehicle 11 within a desired vehicle operating region. In particular, the vehicle operator drives the vehicle 11 in a stable vehicle stability operating region.

At step 92, the steering wheel angle sensor 12 generates a plurality of steering wheel angle values $x_1(i)$ associated with the vehicle 11 over a predetermined time interval, wherein i equals 1 to N values. In one exemplary embodiment, N has a value of 1,000,000.

At step 94, the lateral acceleration sensor 14 generates a plurality of lateral acceleration values $X_2(i)$ associated with the vehicle 11 over the predetermined time interval.

At step 96, the yaw rate sensor 16 generates a plurality of yaw rate values $X_3(i)$ associated with the vehicle 11 over the predetermined time interval.

At step 98, the computer 30 generates a vector $X_1$ having the plurality of steering wheel angle values $x_1(i)$, and the vector $X_1$ is represented by the equation:

$$X_1 = [x_1(1) x_1(2) \ldots x_1(N)]^T.$$

At step 100, the computer 30 generates a vector $X_2$ having the plurality of lateral acceleration values $x_2(i)$, and the vector $X_2$ is represented by the equation:

$$X_2 = [x_2(1) x_2(2) \ldots x_2(N)]^T.$$

At step 102, the computer 30 generates a vector $X_3$ having the plurality of yaw rate values $x_3(i)$, and the vector $X_3$ is represented by the equation:

$$X_3 = [x_3(1) x_3(2) \ldots x_3(N)]^T.$$

At step 104, the computer 30 calculates a mean value for the vector $X_1$, a mean value of the vector $X_2$, and a mean value for the vector $X_3$, utilizing the equation:

$$\overline{X}_i = \sum_{j=1}^{N} x_i(j), \quad i = \{1, 2, 3\}$$

At step 106, the computer 30 calculates a standard deviation value $\sigma_1$ for the vector $X_1$, a standard deviation value $\sigma_2$ for the vector $X_2$, a standard deviation value $\sigma_3$ of the vector $X_3$, utilizing the equation:

$$\sigma_i = \sqrt{\frac{\sum_{j=1}^{N} (x_i(j) - \overline{X}_i)^2}{N}}, \quad i = \{1, 2, 3\}.$$

At step 108, the computer 30 calculates a normalized data vector $Z_1$ for the vector $X_1$, a normalized data vector $Z_2$ for the vector $X_2$, and a normalized data vector $Z_3$ for the vector $X_3$, utilizing the equation:

$$Z_i = \left[ \underbrace{\left(\frac{x_i(1) - \overline{X}_i}{\sigma_i}\right)}_{z_i(1)} \underbrace{\left(\frac{x_i(2) - \overline{X}_i}{\sigma_i}\right)}_{z_i(2)} \cdots \underbrace{\left(\frac{x_i(N) - \overline{X}_i}{\sigma_i}\right)}_{z_i(N)} \right]^T,$$

$$i = \{1, 2, 3\}.$$

At step 110, the computer 30 calculates a plurality of correlation coefficient values for each pair of signals utilizing the following equation:

$$r_{ij} \approx \frac{Z_i^T Z_j}{N}, \quad i, j = \{1, 2, 3\}.$$

At step 112, the computer 30 generates a correlation matrix R having the plurality of coefficient values, represented as:

$$R = \begin{bmatrix} r_{11} & r_{12} & r_{13} \\ r_{21} & r_{22} & r_{22} \\ r_{31} & r_{32} & r_{33} \end{bmatrix}$$

For example, the coefficient value $r_{11}$, represents the correlation between a steering wheel angle value to itself. Further, the coefficient value $r_{12}$ represents the correlation between a steering wheel angle value and a lateral acceleration value. Further, the coefficient value $r_{13}$ represents the correlation between a steering wheel angle value and a yaw rate angle value. It is further noted that $r_{11}=r_{22}=r_{33}=1$. Further, $r_{12}=r_{21}$, $r_{13}=r_{31}$, and $r_{23}=r_{32}$ by virtue of definition.

At step 114, the computer 30 determines a plurality of Mahalanobis distance values wherein each Mahalanobis distance value corresponds to a respective data point in a desired vehicle stability operating region, utilizing the equation:

$$MD(j) = [\,z_1(j)\ \ z_2(j)\ \ z_3(j)\,]R^{-1}\begin{bmatrix}z_1(j)\\z_2(j)\\z_3(j)\end{bmatrix}\Big/3$$

$$j = \{1, 2, \ldots, N\}.$$

wherein
z1(j) corresponds to a steering wheel angle value,
z2(j) corresponds to a lateral acceleration value,
z3(j) corresponds to a yaw rate value At step 115, a vehicle operator generates a histogram of the plurality of Mahalanobis distance values corresponding to respective data points in a desired vehicle stability operating region.

Figure 7:
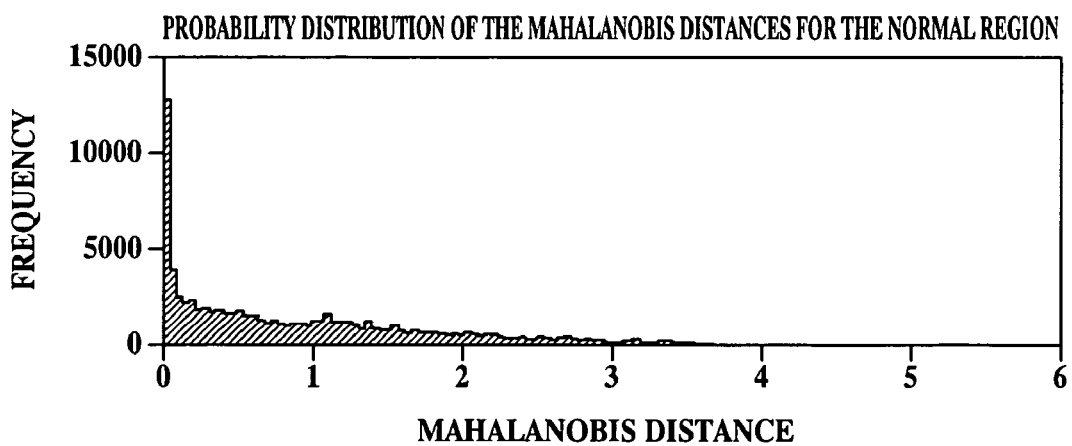
FIG. 7 is a histogram of the Mahalanobis distance values for N data points in a normal region of vehicle operation, that approximates a chi-square distribution with three degrees of freedom.

At step 116, the vehicle operator selects a threshold Mahalanobis distance value based on the plurality of Mahalanobis distance values in the histogram. In particular, a first threshold value is selected that is greater than each of the plurality of Mahalanobis distance values in the histogram. For example, referring to FIG. 7, a histogram of the Mahalanobis distance values for N data points in a normal region of vehicle operation is illustrated that approximates a chi-square distribution with three degrees of freedom. As shown, all of the exemplary Mahalanobis distances are less than a value of six. Accordingly, for one exemplary embodiment, a threshold value is set equal to six for determining whether the vehicle has a stable vehicle stability condition or an unstable vehicle stability condition. After step 116, the method is exited.

Figure 11:
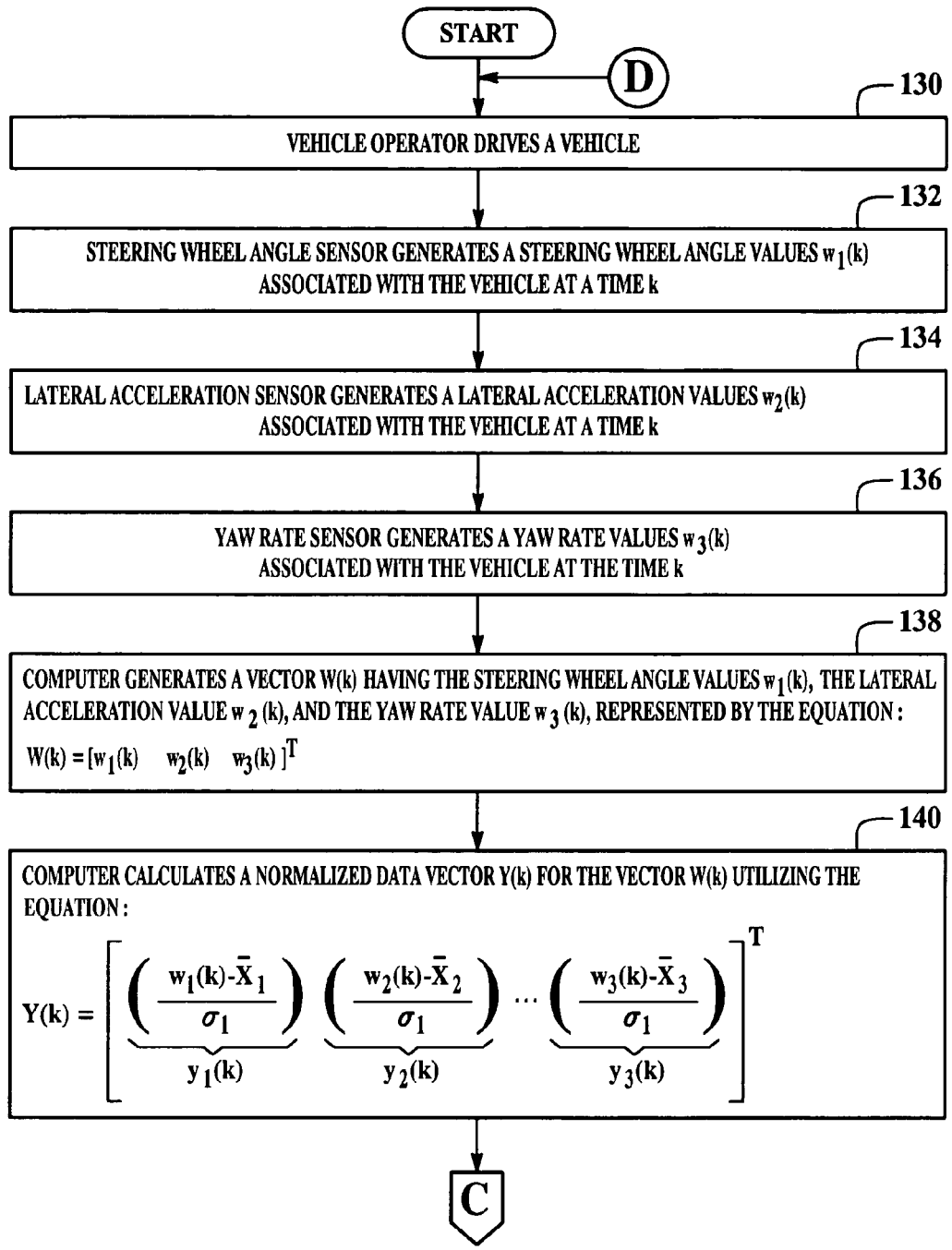
FIGS. 11-13 are flowcharts of a method for determining vehicle stability utilizing the vehicle stability monitoring system of FIG. 1.
Figure 12:
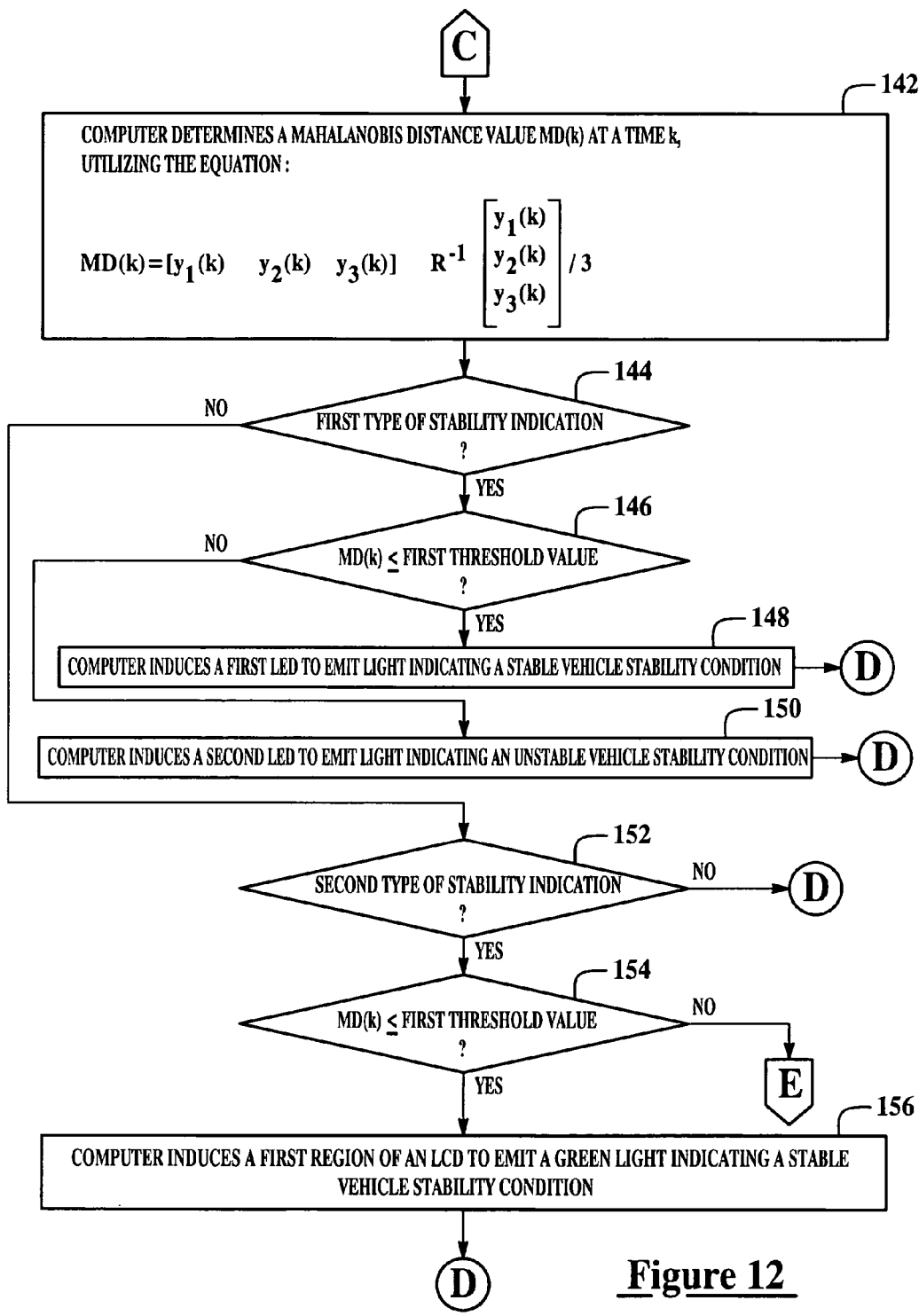
Figure 13:
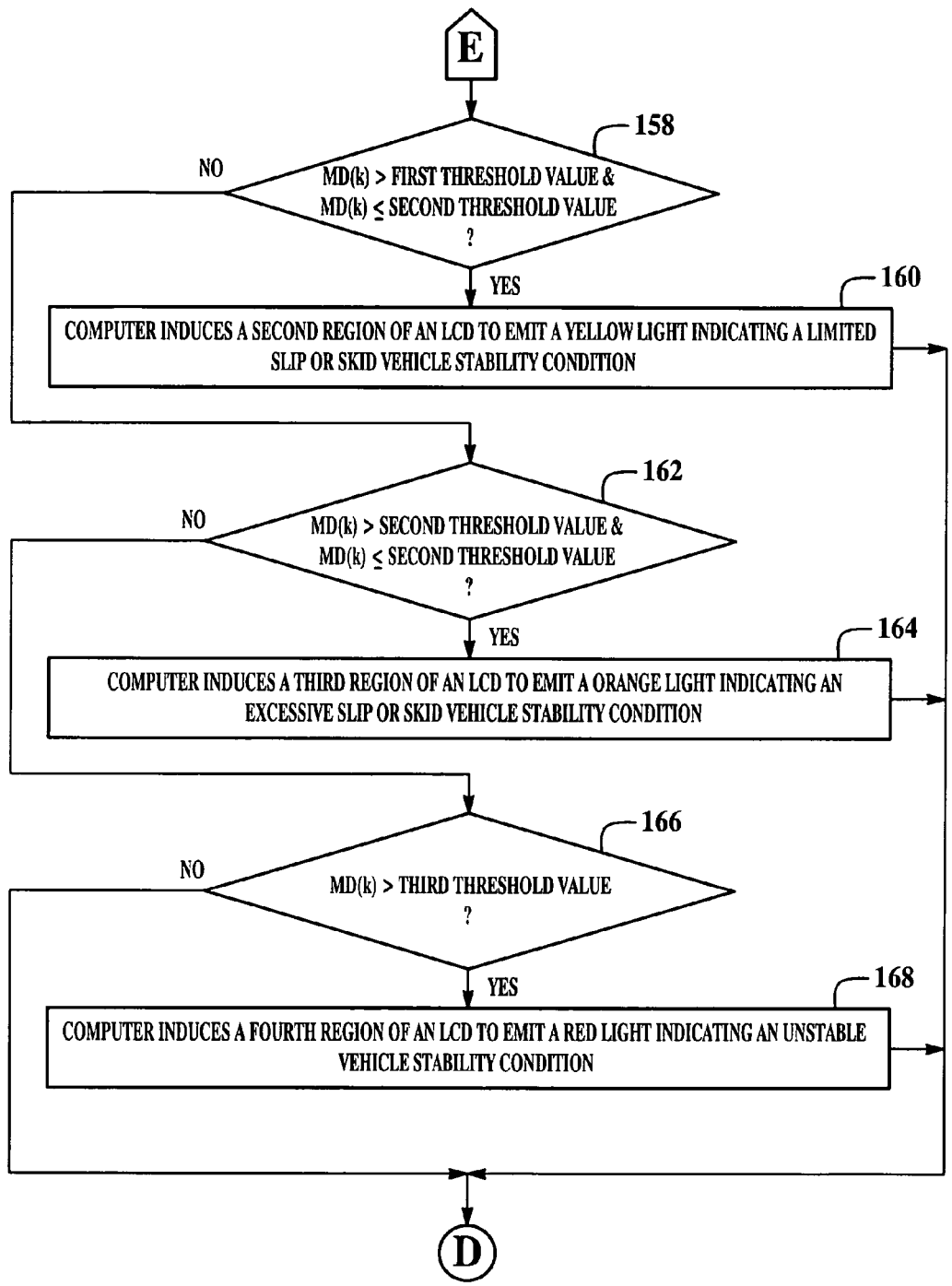

Referring to FIGS. 11-13, a method for determining vehicle stability utilizing the vehicle stability monitoring system 10 will now be explained.

At step 130, a vehicle operator drives the vehicle 11.

At step 132, the steering wheel angle sensor 12 generates a steering wheel angle value $w_1(k)$ associated with the vehicle 11 at a time k.

At step 134, the lateral acceleration sensor 14 generates a lateral acceleration value $w_2(k)$ associated with the vehicle 11 at the time k.

At step 136, the yaw rate sensor 16 generates a yaw rate value $w_3(k)$ associated with the vehicle 11 at the time k.

At step 138, the computer 30 generates a vector W(k) having the steering wheel angle value $w_1(k)$, the lateral acceleration value $w_2(k)$, and the yaw rate value $w_3(k)$, represented by the equation:

$$W(k)=[w_1(k)\,w_2(k)\,w_3(k)]^T.$$

At step 140, the computer 30 calculates a normalized data vector Y(k) for the vector $W_1$, utilizing the equation:

$$Y(k) = \left[\underbrace{\left(\frac{w_1(k)-\overline{X}_1}{\sigma_1}\right)}_{y_1(k)}\ \underbrace{\left(\frac{w_2(k)-\overline{X}_2}{\sigma_2}\right)}_{y_2(k)}\ \underbrace{\left(\frac{w_3(k)-\overline{X}_3}{\sigma_3}\right)}_{y_3(k)}\right]^T.$$

At step 142, the computer 30 determines a Mahalanobis distance value MD(k) at a time k, utilizing the equation:

$$MD(k) = [\,y_1(k)\ \ y_2(k)\ \ y_3(k)\,]R^{-1}\begin{bmatrix}y_1(k)\\y_2(k)\\y_3(k)\end{bmatrix}\Big/3.$$

At step 144, the computer 30 makes a determination as to whether a first type of stability indication is to be provided to the vehicle operator. If the value of step 144 equals "yes" the method advances to step 146. Otherwise, the method advances to step 152.

At step 146, the computer 30 makes a determination as to whether the Mahalanobis distance value MD(k) is less than or equal to a first threshold value. If the value of step 146 equals "yes", the method advances to step 148. Otherwise, the method advances to step 150.

At step 148, the computer 30 generates a signal to induce the LED 32 to emit light indicating a stable vehicle stability condition. After step 148, the method returns to step 130.

At step 150, the computer 30 generates a signal to induce the LED 34 to emit light indicating an unstable vehicle stability condition. After step 150, the method returns to step 130.

Referring again to step 144, when the value of step 144 equals "no", the method advances the step 152. At step 152, the computer 30 makes a determination as to whether a second type of stability indication is to be provided to a vehicle operator. If the value of step 152 equals "yes", the method advances to step 154. Otherwise, the method returns to step 130.

At step 154, the computer 30 makes a determination as to whether the Mahalanobis distance value MD(k) is less than or equal to the first threshold value. If the value of step 154 equals "yes", the method advances to step 156. Otherwise, the method advances to step 158.

At step 156, the computer 30 generates a signal to induce a region 50 of the LCD 36 to emit a green light indicating a stable vehicle stability condition. After step 156, the method returns to step 130.

Referring again to step 154, when the value of step 154 equals "no", the method advances to step 158. At step 158, the computer 30 makes a determination as to whether (i) the Mahalanobis distance value MD(k) is greater than the first threshold value, and (ii) the Mahalanobis distance value MD(k) is less than or equal to a second threshold value, wherein the second threshold value is greater than the first threshold value. If the value of step 158 equals "yes", the method advances to step 160. Otherwise, the method advances to step 162.

At step 160, the computer 30 generates a signal to induce a region 52 of the LCD 36 to emit a yellow light indicating a limited slip or skid vehicle stability condition. After step 160, the method returns to step 130.

At step 162, the computer 30 makes a determination as to whether (i) the Mahalanobis distance value MD(k) is greater than the second threshold value, and (ii) the Mahalanobis distance value MD(k) is less than or equal to a third threshold value, wherein the third threshold value is greater than the second threshold value. If the value of step 162 equals "yes", the method advances to step 164. Otherwise, the method advances to step 166.

At step 164, the computer 30 generates a signal to induce a region 54 of the LCD 36 to emit an orange light indicating an excessive slip or skid vehicle stability condition. After step 164, the method returns to step 130.

At step 166, the computer 30 makes a determination as to whether the Mahalanobis distance value MD(k) is greater than the third threshold value. If the value of step 166 equals "yes", the method advances to step 168. Otherwise, the method returns to step 130.

At step 168, the computer 30 generates a signal to induce a region 56 of the LCD 36 to emit a red light indicating an unstable vehicle stability condition. After step 168, the method returns to step 130.

The above described methods can be at least partially embodied in the form of computer-implemented software algorithms and apparatuses for practicing those processes. In an exemplary embodiment, the methods are at least partially embodied in computer program code stored in at least one computer-readable storage medium and executed by the computer 30.

The vehicle stability monitoring system 10 and the method and article manufacture for determining a vehicle stability provide a substantial advantage over other systems and methods. In particular, the foregoing exemplary embodiments provide a technical effect of generating a single value to quantify an overall vehicle stability. Further, the vehicle stability monitoring system 10 does not need any additional sensors, such as lateral velocity sensors, utilized in other vehicle stability control systems.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for determining vehicle stability, comprising:
    generating a steering wheel angle value associated with a vehicle, utilizing a steering wheel angle sensor;
    generating a lateral acceleration value associated with the vehicle, utilizing a lateral acceleration sensor;
    generating a yaw rate value associated with the vehicle, utilizing a yaw rate sensor;
    determining a first vector having the steering wheel angle value, the lateral acceleration value, and the yaw rate value, utilizing a computer communicating with the steering wheel angle sensor, the lateral acceleration sensor, and the yaw rate sensor;
    determining a normalized data vector based on the steering wheel angle value, the lateral acceleration value, and the yaw rate value, in the first vector, utilizing the computer;
    determining a first Mahalanobis distance value based on the normalized data vector and a correlation matrix, utilizing the computer;
    generating a first signal to induce a first output device to output a first light indicating a stable vehicle stability condition when the first Mahalanobis distance value is less than or equal to a threshold value, utilizing the computer; and
    generating a second signal to induce a second output device to output a second light indicating an unstable vehicle stability condition when the first Mahalanobis distance value is greater than the threshold value, utilizing the computer.

2. A vehicle stability monitoring system, comprising:
    a steering wheel angle sensor configured to generate a steering wheel angle value associated with a vehicle;
    a lateral acceleration sensor configured to generate a lateral acceleration value associated with the vehicle;
    a yaw rate sensor configured to generate a yaw rate value associated with the vehicle;
    a computer operably communicating with the steering wheel angle sensor, the lateral acceleration sensor, and the yaw rate sensor;
    the computer configured to determine a first vector having the steering wheel angle value, the lateral acceleration value, and the yaw rate value;
    the computer further configured to determine a normalized data vector based on the steering wheel angle value, the lateral acceleration value, and the yaw rate value, in the first vector;
    the computer further configured to determine a first Mahalanobis distance based on the normalized data vector and a correlation matrix; and
    the computer further configured to generate a first signal to induce a first output device to output a first light indicating a stable vehicle stability condition when the first Mahalanobis distance value is less than or equal to a threshold value.

3. The vehicle stability monitoring system of claim 2, wherein the computer is further configured to generate a second signal to induce the first output device to output a second light indicating an unstable vehicle stability condition when the first Mahalanobis distance value is greater than the threshold value.

4. The vehicle stability monitoring system of claim 2, wherein the computer is further configured to generate a second signal to induce a second output device to output a second light indicating an unstable vehicle stability condition when the first Mahalanobis distance value is greater than the threshold value.

5. The vehicle stability monitoring system of claim 2, wherein the first output device comprises at least one of an LED or an LCD.

6. An article of manufacture, comprising:
    a computer storage medium having a computer program encoded therein for determining vehicle stability, the computer storage medium comprising:
    code for determining a first vector having a steering wheel angle value associated with a vehicle, a lateral acceleration value associated with the vehicle, and a yaw rate value associated with the vehicle;
    code for determining a normalized data vector based on the steering wheel angle value, the lateral acceleration value, and the yaw rate value, in the first vector;

code for determining a first Mahalanobis distance value based on the normalized data vector and a correlation matrix;

code for generating a first signal to induce a first output device to output a first light indicating a stable vehicle stability condition when the first Mahalanobis distance value is less than or equal to a threshold value; and code for generating a second signal to induce a second output device to output a second light indicating an unstable vehicle stability condition when the first Mahalanobis distance value is greater than the threshold value.

* * * * *